United States Patent

Ueoka et al.

[11] Patent Number: 6,070,570
[45] Date of Patent: Jun. 6, 2000

[54] WIRE-SAW AND ITS MANUFACTURING METHOD

[75] Inventors: Isao Ueoka; Jun Sugawara; Akira Mizoguchi; Hideo Oshita; Masaaki Yamanaka; Hideki Ogawa; Nobuo Urakawa; Hirotoshi Yoshinaga, all of Osaka, Japan

[73] Assignees: Sumitomo Electric Industries, Ltd.; Osaka Diamond Industrial Co., Ltd., both of Osaka, Japan

[21] Appl. No.: 09/155,718

[22] PCT Filed: Feb. 9, 1998

[86] PCT No.: PCT/JP98/00532

§ 371 Date: Mar. 9, 1999

§ 102(e) Date: Mar. 9, 1999

[87] PCT Pub. No.: WO98/35784

PCT Pub. Date: Aug. 20, 1998

[30] Foreign Application Priority Data

Feb. 14, 1997 [JP] Japan ................................... 9-047153
Oct. 30, 1997 [JP] Japan ................................... 9-316482

[51] Int. Cl.[7] .................................................. B28D 5/00
[52] U.S. Cl. ............................ 125/22; 125/21; 125/16.02
[58] Field of Search ................................... 125/22, 16.02, 125/21; 451/526; 83/651.1; 427/249.3; 428/366; 30/166.3

[56] References Cited

U.S. PATENT DOCUMENTS

| 4,015,931 | 4/1977 | Thakur ......................................... 125/21 |
| 4,139,659 | 2/1979 | Ronnquist et al. ................... 427/249.3 |
| 4,384,564 | 5/1983 | Smith et al. ........................... 125/21 X |
| 5,454,750 | 10/1995 | Cosmano et al. ....................... 451/526 |

FOREIGN PATENT DOCUMENTS

| 50-102993 | 8/1975 | Japan . |
| 58-202718 | 11/1983 | Japan . |
| 0271117 | 10/1989 | Japan ................................... 83/651.1 |
| 7-96454 | 4/1995 | Japan . |
| 8-126953 | 5/1996 | Japan . |
| 9-155631 | 6/1997 | Japan . |

*Primary Examiner*—Rinaldi I. Rada
*Assistant Examiner*—Dominic Troiano
*Attorney, Agent, or Firm*—McDermott, Will & Emery

[57] ABSTRACT

The present invention provides a wire saw for use in cutting works of electronics materials or optical materials and a method for manufacturing the same, said wire saw having the following characteristic features. Namely, onto a high-strength core wire 2, abrasive grains 3 having a grain size not smaller than two-thirds the thickness of a layer of resin bond 4 on said core wire 2 but not exceeding a half the diameter of said core wire are fixed with said resin bond, said resin bond containing a filler having a grain size smaller than two-thirds the thickness of said resin bond layer. The thus structured and arranged wire saw has an improved efficiency and precision in cutting. The wire saw can be manufactured readily by using an enamelling oven.

10 Claims, 2 Drawing Sheets

WIRE-SAW AND ITS MANUFACTURING METHOD

FIELD OF THE INVENTION

The present invention relates principally to a wire saw for use in working of electronic materials such as slicing a large-diameter silicon ingot into wafers thereof and working of optical materials such as glass lens cutting and to a method for manufacturing such a wire saw.

PRIOR ART

Heretofore, inner saws or inside diameter blades of diamond have been used for slicing a silicon ingot into wafers, but recently as silicon ingots have increasingly larger diameters it has become prevalent to use loose abrasives and wire saws for such works due to yield, productivity, affected layers, dimensional constraints and the like factors.

However, since working with loose abrasives involves not only a problem of environmental health but a cleaning operation requisite thereto leading to an elongated process line or working time in addition to its insufficient working efficiency and precision, it is now highly needed in the industry to use for such working operations wire saws comprising wires with fixed superadhesives.

A wire saw of the above-mentioned type has been disclosed, for example, in Japanese Preliminarily Laid-open Publication No. Sho 50-102993, which comprises a core wire with superadhesives bonded thereto and a dressing layer applied to the external surface of the core wire having the superabrasives layer, while Japanese Preliminarily Laid-open Publication No. Hei 8-126953 has discussed in detail the characteristic features of wire saws when used for silicon wafer slicing operation, suggesting an advantage of the use of polyethylene, nylon or the like as a material of core wires for such wire saws.

Further, Japanese Preliminarily Laid-open Publication No. Hei 9-155631 suggests use of electroplating process or a synthetic resin binder solution to fix diamond abrasives on to a core wire.

The aforementioned solutions certainly have improvements over the art preceding thereto, respectively. However, for permitting commercial-scale production of such wire saws to reach a level of practical applications, it is necessary to disclose and provide a structure of a wire saw having fixed hard abrasives ranging from conventional abrasives such as SiC and $Al_2O_3$ to so-called superabrasives such as diamond and CBN (cubic boron nitride) together with advantages resulting from that structure and also to provide a method of manufacturing such a wire saw.

SUMMARY OF THE INVENTION

Accordingly, it is an object of the present invention to solve the foregoing problems of the prior art by providing a wire saw and a method of manufacturing the same, in which in a first aspect thereof there are provided a high-strength core wire having abrasives fixed onto the outer peripheral surface thereof and a resin bond layer, the grain size of said abrasives being not smaller than two-thirds the thickness of said resin bond layer but not exceeding a half the diameter of said core wire, the resin bond of said resin bond layer comprising a resin having a modulus of elasticity of 100 kg/mm² or above and a softening temperature of 200° C. or above, said resin containing a filler having a grain size smaller than two-thirds the thickness of said resin bond layer.

The aforementioned abrasives grain size must be larger than or equal to two-thirds the resin bond layer thickness, because if it is smaller than said thickness it will be difficult for the abrasives to exist for at a part thereof on the surface of the resin bond layer and at the same time to protrude outward from said surface.

Also, if the abrasive grain size exceeds a half the core wire diameter, it will be difficult to retain the abrasive grains in place, resulting in reduced cutting ability. Further, to secure a high cutting precision for a long period, the abrasive grain size should preferably be up to about one-third the core wire diameter.

The filler, which is embedded in the resin bond layer just for reinforcing the resin bond, may have a grain size smaller than two-thirds the resin bond layer thickness.

As the high-strength core wore, a string of metal, metal oxide, metal carbide, metal nitride, organic material or carbon material may be used. Amongst of all, it is most preferable to use a piano wire because it can be readily worked and finished into a super fine wire and because it has a high homogeneity and strength. Piano wires may be used without any special treatment, but it is preferable to use wires after being subjected to a surface treatment for improving adhesion to a resin bond and abrasive grain retention.

The surface treatment includes plating a piano wire with brass or copper beforehand or applying a primary coat of resin onto the piano wire.

According to a second aspect of the present invention, the contents of the abrasive grain and filler used are specifically defined. That is to say, the content of the abrasive grain in resin bond ranges from 1% by volume to 30% by volume, with the filler content in resin bond ranging from 1% by volume to 50% by volume.

With an abrasive grain content below 1 vol. % the cutting speed decreases remarkably due to an excessively high cutting resistance per abrasive grain, while an abrasive grain content above 30 vol. % will also results in a reduced cutting speed because removal of the chip produced by cutting becomes inadequate.

Accordingly, the abrasive grain content ranges more preferably from 4 vol. % to 25 vol. %.

With a filler content of the resin bond not less than 1 vol. % it is possible to improve the retention, wear resistance and thermal conductivity of the abrasive grain, while a filler content exceeding 50 vol. % will lower the flexibility of the resin bond layer and result conversely in reduced retention and wear resistance.

Accordingly, the filler content ranges more preferably from 5 vol.% to 40 vol. %.

According to a third aspect of the present invention, it is most preferred to use a diamond or the like superabrasive grain in view of cutting quality and useful life of the resultant wire saw. For improving the bonding ability between the superabrasive grain and the resin bond, it is preferable to plate the superabrasive grain surfaces in advance with a metal such as Ni or Cu. As a filler, it is also preferable to use a hard material such as a superabrasive grain or conventional abrasive grain considering the aforementioned retention, wear resistance and thermal conductivity.

As describe hereinabove, since according to the present invention a resin bond layer is formed of an abrasive grain and a filler of a specified grain size which are contained in a resin having a high modulus of elasticity and a high softening temperature, the resultant wire saw is permitted to be used for cutting or other operations in a continuous process.

Further, according to the present invention, since the abrasives comprise grains having particular sizes larger than the filler grains, the abrasive grains serve the cutting action with their ends brought into contact with a workpiece under cutting even if the abrasive grains are placed substantially flush with the resin bond layer surface without protruding significantly above the latter surface. As the wire saw is used subsequently for cutting operation, the surface of the resin bond layer recedes inward due to wear by cutting and abrasive grains become relatively protuberant above that surface, which effects an improvement in cutting quality. Of course, it goes without saying that it is preferable to arrange so that a portion of the abrasive grains protrude above the resin bond layer surface initially at the manufacture of the wire saw, since in such an arrangement the protruding ends of the abrasive grains act as cutting edges initially when the wire saw is first put into a cutting operation, with such protruding ends acting also as chip pockets.

As to a method for manufacturing a wire for the aforementioned wire saw, it is advantageous to use so-to-say an enamelling process in which the aforesaid core wire is first coated with a coating material comprising a mixture of the aforementioned abrasive grain and filler with a solution containing the aforementioned resin dissolved therein and then the coating is dried and cured, because such a process tends to cause the abrasive grains protrude and project without difficulty.

The enamelling may be easily accomplished by passing the core wire immersedly through the coating bath and then feeding it in a drying and curing stage. Both the lead-in section to the drying and curing stage and the drying and curing stage are preferably of a vertical type so that homogeneous dispersion of the abrasive grain and uniform thickness of the resin bond layer are secured.

It is also preferred that a floating die is employed in the lead-in section to control the state of adhesion of the coating fluid on the core wire.

Proportion of the solvent in the coating composition ranges preferably from 25% by volume to 75% by volume of the total coating composition. For coating properties and protrusion of the adhesive grains to be effected when the grains are fixed by drying, it is necessary for the coating composition to contain not less than 25 vol. % of the solvent, while its proportion in excess of 75 vol. % is problematical, in that the drying rate will decrease and the solvent will undergo during the drying process a sudden volatilization to cause foaming in the resin bond layer, which results in loss of retention strength and wear resistance of the abrasive grain. Thus, the proportion of the solvent in the coating composition ranges most preferably from 40 vol. % to 60 vol. % in view of viscosity of the coating composition affecting the workability and formation of protrusion of the abrasive grains.

For the resin bond, any resins satisfying the aforementioned conditions for modulus of elasticity and softening temperature may be used. Preferably, alkyd resins, phenolic resin, formalin resin, polyurethane resin, polyester resin, polyimide resin, epoxy resin, melamine resin, urea resin, unsaturated polyester resin, allyl resin, polyester-imide resin, polyamideimide resin, polyester-urethane resin, bis-maleimide resin, bismaleimide-triazine resin, cyanate ester resin, polyether-imide resin, polyparabanate resin, aromatic polyamide resin, etc. may be used from the viewpoint of easiness in coating and physical properties.

According to the present invention, any solvents permitting dissolution of the aforementioned resins may be used, including alkylbenzenes such as xylene, toluene, benzene, ethylbenzene, etc., phenols such as phenol, cresol, xylenol, etc., alcohols such as ethanol, butanol, etc., ketones such as acetone, methyl ethyl ketone, cyclohexanone, etc., ethers such as tetrahydrofuran, dioxane, etc., and aprotic solvents such as $NM_2P$, DMF, DMAC, DMSO, etc. subject to selection depending on the specific resin used.

It is also necessary to improve the strength and wear resistance of the resin bond layer by adding to the aforementioned resin solution a filler including fine grain diamond, $Al_2O_3$, SiC, $SiO_2$, $CrO_2$, BN, mica, talc, calcium carbonate, kaolin, clay, titanium oxide, barium sulfate, zinc oxide, magnesium hydroxide, potassium titanate, magnesium sulfate, or metal powder such as Cu or Fe. Among others, fine grain diamond is most preferred because it is highly effective in improving such a strength and wear resistance of the resin bond layer as well as thermal conductivity of the latter and also in view of the useful life and cutting precision of the resultant wire saw. Next to the fine grain diamond, hard materials such as SiC, and $Al_2O_3$ are also preferable. The filler should have a grain size smaller than two-thirds of the thickness of the resin bond layer, and fillers having flat-shaped or needle-like grains may also be used as falling within the range of the present invention, so long as they have thickness or diameters smaller than two-thirds the resin bond layer thickness.

The coating process may also be accomplished by first heat-melting a resin used as the bond, then adding the abrasive grain and filler to the molten resin, subsequently charging the resultant mixture solution into a melting extruder, through which the core wire is passed so that the outer peripheral surface thereof is extrusion-coated with a composition of said mixture solution.

In the latter case, the resultant coated wore will have a structure as shown in cross-section in FIG. 2, with lower protrusions and projections of the abrasive grains resulting as compared with the preceding coating method.

THE BEST MODE FOR CARRYING OUT THE INVENTION

Figure 1:
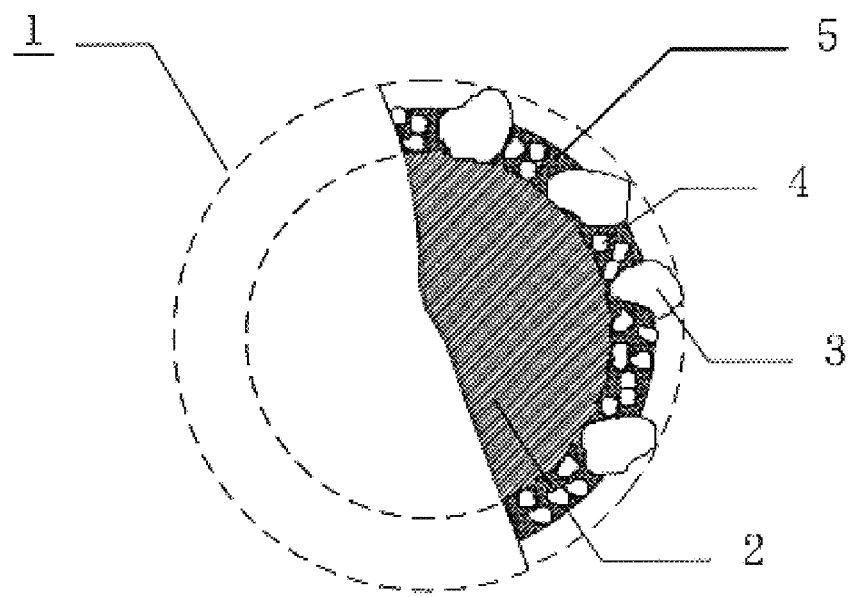
FIG. 1 is a schematic cross-sectional view illustrating a structure of a wire saw 1 according to the present invention, having a core wire 2, abrasive grain 3, filler 4, and a resin bond layer 5, with said abrasive grains fixed in the resin bond layer 5 so as to protrude and project as least a portion thereof above the external surface of said layer.
Figure 2:
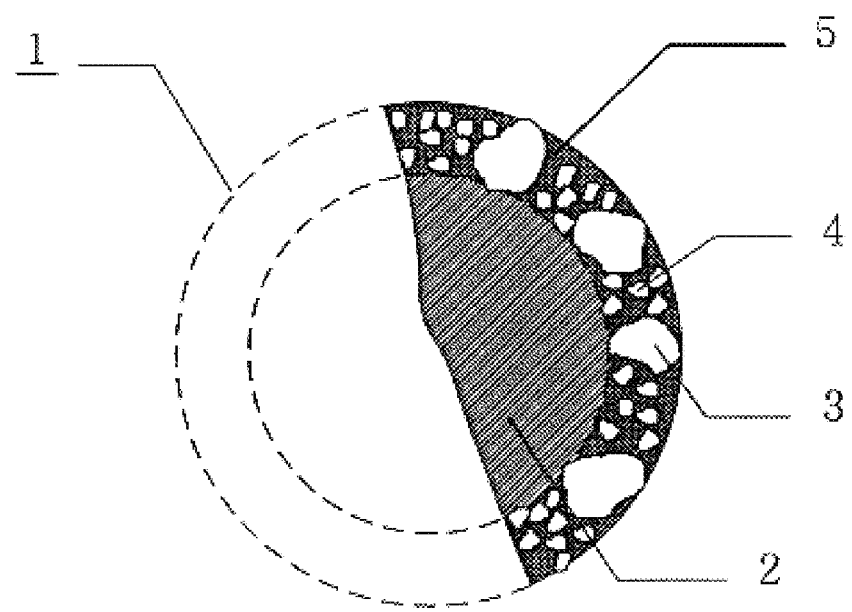
FIG. 2 is a schematic cross-sectional view of a wire saw according to another embodiment of the present invention, in which the abrasive grains 3 protrude only a small height above the external surface of the resin bond layer 5 and in its extreme case the outer ends of the abrasive grains lie substantially flush with the surface of the latter layer, as shown.

Hereinafter, the present invention will be described in greater detail based on 4 preferred experimental examples accomplished to experimentally determine the structure of the wire saw according to the present invention and 29 preferred examples accomplished to determine structural requirements of the wire saw according to the present invention, as compared with 5 comparative examples.

Preferred Experimental Example 1

A coating composition was prepared by adding fine grain diamond of 25 μm in average grain size and $SiO_2$ of 10 μm in average grain size to a polyurethane resin solution (polyurethane resin content: 45 vol. %) produced by Totoku Paint Co., Ltd., said resin solution comprising a polyurethane resin dissolved in a mixture of at least one phenol and at least one alkylbenzene, so that the resultant coating composition contained 2.2 ct/cm³, respectively, of fine grain diamond of 25 μm in average grain size and SiO₂ of 10 μm in average grain size.

Then, the resultant coating composition was applied onto a brass-plated piano wire of 0.18 mm in diameter, and the coated wire after being passed through a floated die of 0.24 mm in bearing diameter was dried to cure in a vertical baking furnace at 300° C. to be formed into a wire saw.

The resultant wire saw and a wire diameter of 0.22 mm and a resin film thickness (resin bond layer thickness) of approximately 14 μm.

Preferred Experimental Example 2

A wire saw was fabricated in a similar manner as in the foregoing Experimental Example 1, except that a coating composition used was prepared by adding fine grain diamond of 25 μm in average grain size and SiO₂ of 5 μm in average grain size to a phenolic resin solution (phenolic resin content: 50 wt. %) comprising a phenolic resin (produced by Sumitomo Bakelite Co., Ltd.) dissolved in cresol, so that the resultant coating composition contained 2.2 ct/cm³ of fine diamond grain and 1.1 ct/cm³ of SiO₂, respectively.

The resultant wire saw had a wire diameter of 0.22 mm and a resin film thickness of approximately 15 μm.

Preferred Experimental Example 3

A coating composition was prepared by adding fine grain diamond of 25 μm in average grain size and a Cu powder of 5 μm in average grain size to a bismaleimide resin solution, which was prepared in a similar manner as in the foregoing Experimental Example 2 except that a bismaleimide resin (produced by Mitsui Toatsu Chemicals, Inc., present Mitsui Chemicals, Inc.) was used in place of the phenolic resin, so that the resultant coating composition contained 3.3 ct/cm³ of fine diamond grain and 6.3 vol. % of Cu, respectively. A wire saw was fabricated in a similar manner as in the foregoing Experimental Example 2.

The resultant wire saw had a wire diameter of (0.22 mm and a resin film thickness of approximately 15 μm.

Preferred Experimental Example 4

A phenolic resin (produced by Sumitomo Bakelite Co., Ltd.) was dissolved in cresol to obtain a phenol resin solution containing 45 vol. % of the phenolic resin. To the resultant phenolic solution, were added a fine grain diamond of 35 μm in average grain size and SiC of 5 μm in average grain size, so that the resultant coating composition contains the phenolic resin solution, fine grade diamond and SiC at a ratio of 60:10:30 (by volume). Then, the resultant coating composition was applied onto a brass-plated piano wire of 0.18 mm in diameter, and the coated wire after being passed through a floated die of 0.28 mm in bearing diameter was dried to cure in a baking furnace at 300° C. to be formed into a wire saw.

The resultant wire saw had a wire diameter of 0.25 mm and a resin film thickness of approximately 18 μm.

Curing Tests with the Wire Saws of Preferred Experimental Examples

The wire saw obtained in Experimental Example 3 above was subjected to a test for cutting a single crystal silicon block. The single crystal silicon block was 100 mm square× 30 mm thick in size which permitted a cut area of 100 mm×30 mm.

The wire saw used was 30 m long. As to working conditions, the wire saw was reciprocated at 400 mm/min. under wire tension of 2.5 kgf using tap water as a working fluid.

The cut slit had a width of 0.25 mm and cutting feed rate was stable at 3.7 mm/min. over a cut cross-sectional area of 1500 cm².

The wire saw obtained in Experimental Example 4 above was subjected to a test for cutting a single crystal silicon block. The single crystal silicon block used was 100 mm square×33 mm thick in size which permitted a cut area of 100 mm×30 mm.

The wire saw used was 30 m long. As to working conditions, the wire saw was reciprocated at 500 mm/min. under wire tension of 2.5 kgf using tap water as a working fluid.

The cut slit had a width of 0.25 mm and cutting feed rate was stable at 3.7 mm/min. over a cut cross-sectional area of 1500 cm².

The wire saw obtained in Experimental Example 4 above was subjected to a test for cutting a single crystal silicon block. The single crystal silicon block used was 100 mm square×30 mm thick in size which permitted a cut area of 100 mm×30 mm.

The wire saw used was 30 m long. As to working conditions, the wire saw was reciprocated at 500 mm/min. under wire tension of 2.5 kgf using tap water as a working fluid.

The cut slit had a width of 0.29 mm and cutting feed rate was stable at 4.6 mm/min. over a cut cross-sectional area of 1500 cm².

Preferred Example 1

Figure 3:
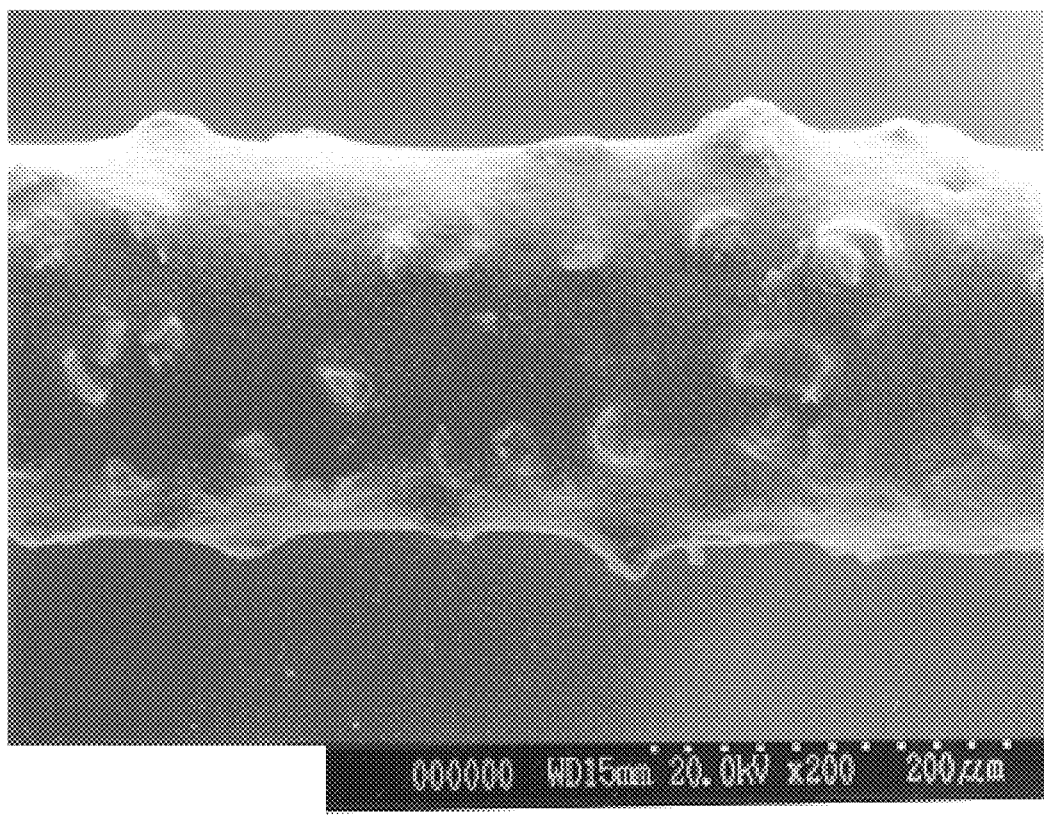
FIG. 3 is a photomicrograph showing an outer peripheral surface of the wire saw of FIG. 1 as observed at 200× magnification, with diamond grains used as the abrasive grains protruding in particulate shapes on said outer peripheral surface.

A coating composition was prepared by mixing a phenolic resin coating material (BRP-5980 produced by Showa High-polymer Co., Ltd. as dissolved in cresol), a diamond filler (IRM2-4 produced by Tomei Daiamond Co., Ltd.) of 30 μm in average grain size at a ratio of 60 vol. %:20 vol. %:20 vol. % as solid contents and adding thereto cresol as a solvent so that the resultant coating composition contained 50 vol. % of the solvent. Then, the resultant coating composition was applied onto a brass-plated piano wire of 0.18 mm in diameter, and the coated wire after being passed through a floated die of 0.28 mm in diameter was dried and cured in a vertical enamelling oven at 300° C. to be formed into a wire saw. The resultant wire saw had a wire diameter of 0.239 mm and a resin bond layer thickness of approximately 19 μm after being baked to cure. The structure of the resultant wire saw is schematically shown in cross-section in FIG. 1, and a state of its outer peripheral surface is shown as enlarged in a photomicrograph of FIG. 3 at 200× magnification.

Table 1 shows the actual grain size distribution of the aforementioned diamond filler having an average grain size of 2.6 μm and the diamond abrasive grains having an average grain size of 30 μm, as measured by a laser diffractometry particle size distribution measurement system (SALD-2000A made by Shimadzu Corporation)

TABLE 1

| IRM2-4 Nominal average grain size 2.6 μm | | IRM30-40 Nominal average grain size 30 μm | | IRM20-30 Nominal average grain size 21 μm | |
| --- | --- | --- | --- | --- | --- |
| Grain size (μm) | Content (%) | Grain size (μm) | Content (%) | Grain size (μm) | Content (%) |
| Below 1.1 | 2 | Below 12.5 | 0 | below 10.0 | 2 |
| 1.1 ~ 2.1 | 17 | 12.5 ~ 15.3 | 4 | 10.0 ~ 14.0 | 10 |
| 2.1 ~ 3.1 | 55 | 15.3 ~ 18.7 | 9 | 14.0 ~ 16.0 | 5 |
| 3.1 ~ 4.6 | 20 | 18.7 ~ 22.9 | 4 | 16.0 ~ 18.0 | 8 |

TABLE 1-continued

| | IRM2-4 Nominal average grain size 2.6 μm | | IRM30-40 Nominal average grain size 30 μm | | IRM20-30 Nominal average grain size 21 μm | |
|---|---|---|---|---|---|---|
| Grain size (μm) | Content (%) | Grain size (μm) | Content (%) | Grain size (μm) | Content (%) | |
| 4.6 ~ 6.9 | 3 | 22.9 ~ 28.0 | 18 | 18.0 ~ 20.0 | 11 |
| 6.9 ~ 10.3 | 1 | 28.0 ~ 34.3 | 32 | 20.0 ~ 22.0 | 15 |
| 10.3 ~ 15.3 | 1 | 34.3 ~ 41.9 | 24 | 22.0 ~ 25.0 | 21 |
| above 15.3 | 1 | 41.9 ~ 51.2 | 8 | 25.0 ~ 30.0 | 18 |
| | | Above 51.2 | 1 | 30.0 ~ 40.0 | 9 |
| | | | | above 40.0 | 1 |

Assuming that the wire saw according to the present invention has a resin bond layer thickness (resin film thickness) of 20 μm, the abrasive grain should have a 20 μm×2/3=13 μm or larger grain size and the filler grain size should be smaller than 13 μm.

Thus, based on the results shown in Table 1, IRM2-4 might be used as a filler containing approx. 1% of abrasive grain, and IRM30-40 and IRM20-30 might be used as abrasive grains containing approx. 4% and approx. 12% of filler, respectively.

The phenolic resin coating material used in Preferred Example 1 was applied on a sheet of aluminium foil and baked for two hours to cure in a thermostatic chamber at 200° C. Consequently, phenolic resin film approx. 30 μm thick was formed on the surface of the aluminium foil. When measured on a tensile tester (AG-1000E made by Shimadzu Corporation), the film showed a modulus of elasticity of 170 kg/mm$^2$.

When measured in accordance with the rating method for enamel wires subject to JIS C-3003, the resin bond layer of the wire saw obtained in Preferred Example 1 had a softening temperature of 330° C.

The wire saw of Preferred Example 1 having the aforementioned structure and arrangement was subjected to cutting test, in which a single crystal silicon block 100 mm square was cut at a wire saw speed of 400 m/min. under a hold-down pressure of 2.5 kgf in the presence of running cooling water. The cutting work proceeded successfully at a cutting speed of 6.8 mm/min. immediately after the start of cutting and 4.6 mm/min. 1 hour thereafter.

Preferred Examples 2 through 6 and Comparative Examples 1 through 3

In place of the phenolic resin coating used in the Preferred Example above, a polyester coating material (Delacoat E-220 produced by Nitto Denko Corporation; Preferred Example 2), a polyester-imide coating material (Isomid 40 produced by Nippon Shokubai Kagaku Kogyo Co., Ltd.; Preferred Example 3), a polyamide-imide coating material (HI-406 produced by Hitachi Chemical Co., Ltd.; Preferred Example 4), a polyurethane coating material (TPU-6155 produced by Totoku Paint Co., Ltd.; Preferred Example 5), a bismaleimide resin coating (BMI-S produced by Mitsui Toatsu Chemicals, Inc. (present Mitsui Chemicals, Inc.) as dissolved in cresol; Preferred Example 6), a polyamide resin coating material (CM3001 produced by Toray Industries, Inc. as dissolved in cresol; Comparative Example 1), a phenoxy resin coating material (YP-50 produced by Toto Chemical Industry Co., Ltd. as dissolved in cresol; Comparative Example 2), a silicone resin coating material (H-19 produced by Toray Silicone, Ltd. as dissolved in cresol; Comparative Example 3) were used, respectively. Wire saws were fabricated and subjected to cutting tests on single crystal silicon blocks in otherwise similar manner as in the preceding Preferred Example 1, results of which are given in Table 2.

Softening temperatures of the resultant respective wire saws and modulus of elasticity of resin films thereof are also shown in Table 2.

TABLE 2

| | Preferred example 1 | Preferred example 2 | Preferred example 3 | Preferred example 4 | Preferred Example 5 | Preferred example 6 | Comparative example 1 | Comparative example 2 | Comparative example 3 |
|---|---|---|---|---|---|---|---|---|---|
| Modulus of Elasticity kg/mm$^2$ | 170 | 160 | 180 | 200 | 190 | 220 | 50 | 140 | 30 |
| Softening Temperature ° C. | 330 | 320 | 360 | 410 | 250 | 380 | 60 | 110 | 50 |
| Core wire O.D. mm | 0.239 | 0.237 | 0.237 | 0.236 | 0.238 | 0.236 | 0.238 | 0.239 | 0.237 |
| Resin bond Layer thickness mm | 0.019 | 0.017 | 0.018 | 0.017 | 0.018 | 0.017 | 0.018 | 0.019 | 0.018 |
| Cutting speed A mm/min. | 6.8 | 6.5 | 6.7 | 7.1 | 6.3 | 6.7 | 2.5 | 4.1 | 3.1 |
| Cutting speed B mm/min. | 4.6 | 4.6 | 4.8 | 4.9 | 4.3 | 5.1 | 1.3 | 1.8 | 1.6 |

Cutting speed A: cutting speed immediately after the start of cutting
Cutting speed B: cutting speed 1 hour after the start of cutting operation Preferred Examples 7 through 13

Wire saws were fabricated in a similar manner as in Preferred Example 1, except that the solid contents of the phenolic resin, diameter filler, diamond abrasive grain were changed to 75 vol. %, 5 vol. % and 20 vol. % (Preferred Example 7); 70 vol. %, 10 vol. % and 20 vol. % (Preferred Example 8); and 50 vol. %, 30 vol. % and 20 vol. % (Preferred Example 9), respectively. The resultant respective wire saws were subjected to cutting tests on single crystal silicon blocks, the results of which are given in Table 3. The table also shows the results of cutting tests on Preferred Examples 10 and 11 using very small filler contents as well as on Preferred Examples 12 and 13 using conversely large filler contents, respectively. In Preferred Example 10, variations in distribution of the abrasive grain size brought forth the 1% content of filler as replaced by the abrasive grain, though the blending ratio of the filler was 0%, as shown in the table.

TABLE 3

|  | Preferred example 1 | Preferred example 7 | Preferred Example 8 | Preferred example 9 | Preferred example 10 | Preferred example 11 | Preferred example 12 | Preferred example 13 |
| --- | --- | --- | --- | --- | --- | --- | --- | --- |
| Abrasive grain | Diamond | Diamond | Diamond | Diamond | Diamond | Diamond | Diamond | Diamond |
| Average abrasive grain size μm | 30 | 30 | 30 | 30 | 30 | 30 | 30 | 30 |
| Filler | Diamond | Diamond | Diamond | Diamond | Diamond | Diamond | Diamond | Diamond |
| Average filler grain size μm | 2.6 | 2.6 | 2.6 | 2.6 | 2.6 | 2.6 | 2.6 | 2.6 |
| Filler content Vol. % | 20.6 | 5.8 | 10.7 | 30.5 | 1.0 | 2.0 | 40.0 | 50.0 |
| Core wire O.D. mm | 0.239 | 0.236 | 0.238 | 0.239 | 0.222 | 0.227 | 0.224 | 0.225 |
| Resin bond layer Thickness mm | 0.019 | 0.016 | 0.018 | 0.019 | 0.012 | 0.013 | 0.015 | 0.016 |
| Cutting speed A mm/min. | 6.8 | 4.5 | 5.7 | 6.7 | 4.1 | 4.2 | 5.3 | 4.3 |

Cutting speed A: cutting speed immediately after start of cutting
Filler content: volumetric % to the volume of (resin + filler + abrasive grain) (determined based on grain size distribution)

Preferred Examples 14 through 15

Wire saws were fabricated in a similar manner as in Preferred Example 1, except that, in place of the diamond abrasive grain of 30 μm in average grain size, a diamond abrasive grain of 21 μm in average grain size (IRM20-30 produced by Tomei Diamond Co., Ltd.; Preferred Example 14), a Ni-plated diamond grain of 30 μm in average grain size (IRM-NP30-40 produced by Tomei Diamond Co., Ltd.; Preferred Example 15) and a Ni-plated diamond grain of 21 μm in average grain size (IRM-NP20-30; Preferred Example 16), were used, respectively. The resultant respective wire saws were cutting tests on single crystal silicon blocks, the results of which are given in Table 4.

Also in a similar manner as in Example 1, the grain size distribution of the diamond grain of 21 μm in average grain size was measured, the result of which is given in previous Table 1

TABLE 4

|  | Preferred example 14 | Preferred example 15 | Preferred example 16 | Preferred example 17 | Preferred example 18 |
| --- | --- | --- | --- | --- | --- |
| Abrasive grain | Diamond | Ni-plated diamond | Ni-plated diamond | SiC | Diamond |
| Average abrasive grain Size μm | 21 | 30 | 21 | 32 | 30 |
| Filler | Diamond | Diamond | Diamond | Diamond | SiC |
| Average filler Grain size μm | 2.6 | 2.6 | 2.6 | 2.6 | 1.2 |
| Filler Content vol. % | 22.2 | 20.6 | 22.2 | 19.8 | 20.0 |
| Core wire O.D. mm | 0.233 | 0.238 | 0.232 | 0.237 | 0.238 |
| Resin bond Layer thickness mm | 0.018 | 0.018 | 0.017 | 0.017 | 0.017 |
| Cutting speed A mm/min. | 5.6 | 8.7 | 6.5 | 4.6 | 6.5 |
| Cutting speed B mm/min. |  | 6.9 | 4.2 |  |  |

Cutting speed A: cutting speed immediately after start of cutting
Cutting speed B: cutting speed 1 hour after the start of cutting operation
Filler content: volumetric % to the volume of (resin + filler + abrasive grain) (determined based on grain size distriibution)

Preferred Examples 17 and 18

Wire saws were fabricated in a similar manner as in Preferred Example 1, except that in place of the diamond abrasive grain of 30 μm in average grain size an SiC abrasive grain of 32 μm in average grain size (Green SiC Mesh 400 produced by FUJIMI Abrasive Materials Co., Ltd.: Preferred Example 17) was used and SiC of 1.2 μm in average grain size (Gree SiC Mesh 8000 produced by FUJIMI Abrasive Materials Co., Ltd.: Preferred Example 18) in place of the filler of 2.6 μm in average grain size. The resultant respective wire saws were subjected to cutting tests on single crystal silicon blocks, the results of which are given also in Table 4 above.

Preferred Examples 19 through 21 and Comparative Examples 4 and 5

Wire saws were fabricated in a similar manner as in Preferred Example 1, except that abrasive grains of Ni-plated diamond and diamond fillers were used, based on the abrasive grain size and blending ratios by volume as shown in Table 5. The resultant respective wire saws were subjected to cutting tests on single crystal silicon blocks, the results of which are given also in Table 5. Although Preferred Example 21 achieved higher cutting speeds both for A and B, cut surface showed larger irregularities as compared with other preferred examples. By the way, Comparative Example 4 using a smaller average grain size showed very low cutting speeds, while Comparative Example 5 using an average grain size larger than a half the core wire diameter resulted in inability of fixing the abrasive grains by baking.

TABLE 5

|  | Preferred example 19 | Preferred example 120 | Preferred example 21 | Comparative example 4 | Comparative example 5 |
|---|---|---|---|---|---|
| Abrasive grain | Ni-plated diamond | Ni-plated diamond | Ni-plated diamond | Ni-plated diamond | Ni-plated diamon |
| Average abrasive grain size μm | 16 | 14 | 85 | 7 | 115 |
| Filler | Diamond | Diamond | Diamond | Diamond | Diamond |
| Average filler grain size μm | 2.6 | 2.6 | 2.6 | 2.6 | 2.6 |
| Filler content vol. % | 20.9 | 21.8 | 20.9 | 30.2 | 20.9 |
| Core wire O.D. mm | 0.195 | 0.196 | 0.288 | 0.212 | — |
| Resin bond layer thickness mm | 0.019 | 0.017 | 0.018 | 0.017 | — |
| Cutting speed A min/min | 6.3 | 5.5 | 9.5 | 1.9 | — |
| Cutting speed B mm/min | 2.1 | 1.8 | 7.0 | 0.0 | — |

Preferred Examples 22 through 29

Wire saws were fabricated in a similar manner as in Preferred Example 1, except that abrasive grains of Ni-plated diamond and diamond fillers were used, based on the abrasive grain size and blending ratios by volume as shown in Table 6. The resultant respective wire saws were subjected to cutting tests on single crystal silicon blocks, the results of which are given also in Table 6.

TABLE 6

|  | Preferred example 22 | Preferred Example 23 | Preferred example 24 | Preferred example 25 | Preferred example 26 | Preferred example 27 | Prefemed example 28 | Preferred example 29 |
|---|---|---|---|---|---|---|---|---|
| Abrasive grain | Ni-plated diamond | Ni-plated Diamond | Ni-plated diamond | Ni-plated diamond | Ni-plated diamond | Ni-plated Diamond | Ni-plated diamond | Ni-plated diamond |
| Average abrassive grain size, μm | 30 | 30 | 30 | 30 | 30 | 30 | 30 | 30 |
| Filler | Diamond | Diamond | Diamond | Diamond | Diamond | Diamond | Diamond | Diamond |
| Abrasive grain content vol. % | 4.2 | 7.9 | 11.3 | 15.0 | 18.7 | 22.4 | 1.5 | 30.0 |
| Average filler grain size, μm | 2.6 | 2.6 | 2.6 | 2.6 | 2.6 | 2.6 | 2.6 | 2.6 |
| Filler content vol. % | 23.6 | 22.7 | 22.0 | 21.1 | 20.2 | 19.3 | 20.9 | 20.9 |
| Core wire O.D. mm | 0.222 | 0.227 | 0.230 | 0.231 | 0.233 | 0.230 | 0.223 | 0.227 |
| Resin bond layer thickness mm | 0.015 | 0.017 | 0.018 | 0.018 | 0.019 | 0.018 | 0.015 | 0.017 |
| Cutting speed A mm/min. | 5.5 | 7.5 | 8.3 | 9.5 | 9.0 | 7.6 | 4.4 | 4.5 |
| Cutting speed B mm/min. | 3.2 | 4.8 | 5.0 | 5.0 | 4.9 | 2.0 | 2.8 | 1.9 |

As clearly seen from the results of the foregoing experimental preferred examples, preferred examples and comparative examples, the wire saws according to the present invention are far superior to the wire saws of the comparative examples both in cutting speed immediately after the start of cutting operation and in cutting speed 1 hour thereafter. In addition, when subjected further cutting tests subsequently the wire saws according to the present invention kept a substantially constant speed with a relatively small reduction from the level at 1 hour later the start of cutting, thus permitting continuous cutting operation.

It could be supposed that the aforementioned high performance of the wire saw according to the present invention results from the fact that the abrasive grains protruding outward are fixed fast and strongly to the outer periphery of the high-strength core wire with the filler-containing resin bond by being arranged so as to be provided with a high thermal resistance and abrasive resistance durable to a working pressure and heat during cutting operations.

In order to secure such fast and strong fixing of the protruding and projecting abrasive grains, it is necessary that the resin used have 100 kg/mm$^2$ or higher modulus of elasticity and 200° C. or higher softening temperature and contain a hard filler.

The aforementioned filler used as having a grain size smaller than two-thirds the resin bond layer thickness principally reinforces the resin bond by being embedded in the resin bond layer, while the aforementioned abrasive grain used as having a grain size larger than or equal to two-thirds the resin bond layer thickness according to the present invention permits the coating composition to be cured onto the aforesaid outer periphery of the core wire when baked, so that the abrasive grains protrude and project above the resin bond layer surface to form cutting edges and chip pockets.

Accordingly, it goes without saying that the core wire diameter, the type and quantity of the resin, abrasive grain and filler and the grain size of the abrasive grain and filler as well as height of protuberance of the abrasive grains are requiredly selected, within the scope of the present invention as defined by appended claims, depending on specific objects to be cut and cutting conditions so that an optimum working efficiency and working precision can be secured.

INDUSTRIAL APPLICABILITY

As fully described hereinbefore, the present invention provides, readily and with an economical feasibility, an abrasive grain wire saw permitting such slicing work with a wire saw, as an improved substitution for the wafer slicing with loose abrasives according to the prior art. Further, the wire saw according to the present invention provides a cutting ability at least 10 times as higher as that of the loose abrasives type together with an adequate working performance and precision.

What is claimed is:

1. A wire saw comprising a high-strength core wire, a layer of a resin bond coating said core wire, a resin of said resin bond having a modulus of elasticity of 100 kg/mm$^2$ are above and a softening temperature of 200° C. or above and said resin bond containing filler having a grain size smaller than two-thirds the thickness of said resin bond layer, and abrasive grains fixed in said resin bond layer and having a grain size not smaller than two-thirds the thickness of said resin bond layer but not exceeding a half the diameter of said core wire.

2. A wire saw according to claim 1, wherein said abrasive grains protrude partially above the external surface of said resin bond layer.

3. A wire saw according to claim 1, wherein the content of said abrasive grains ranges from 1 to 30% by volume of said resin bond comprising said resin, filler and abrasive grains.

4. A wire saw according to claim 1, wherein the content of said filler ranges from 1 to 50% by volume of said resin bond comprising said resin, filler and abrasive grains.

5. A wire saw according to claim 1, wherein said abrasive grains comprise superabrasive grains such as diamond or CBN.

6. A wire saw according to claim 5, wherein said superabrasive grains are metal-plated.

7. A wire saw according to claim 1, wherein said filler comprises superabrasive grains such as diamond or CBN, or wherein said filler comprises a conventional abrasive grains such as SiC or Al$_2$O$_3$.

8. A wire saw according to claim 1, wherein said high-strength core wire comprises a surface-treated piano wire.

9. A method for producing a wire saw comprising preparing a coating composition containing a resin bond, coating a core with said coating composition and heating the same so as to form a layer of said resin bond fixed onto the outer peripheral surface of said core wire, said coating composition comprising said resin bond, a resin of said resin bond having a modulus of elasticity of 100 kg/mm2 or above and a softening temperature of 200° C. or above, abrasive grains having a grain size not smaller than two-thirds the thickness of said resin bond layer but not exceeding a half the diameter of said core wire and filler having a grain size smaller than two-thirds the thickness of said resin bond layer, said abrasive grains and said filler being added to a solution of said resin in a solvent.

10. A method for producing a wire saw according to claim 9, wherein the proportion of said solvent in said coating composition ranges from 25 to 75% by volume of the total coating composition.

* * * * *